March 5, 1940.  J. G. SCOTT  2,192,562
REFRIGERATOR APPARATUS
Filed March 11, 1939  3 Sheets-Sheet 1
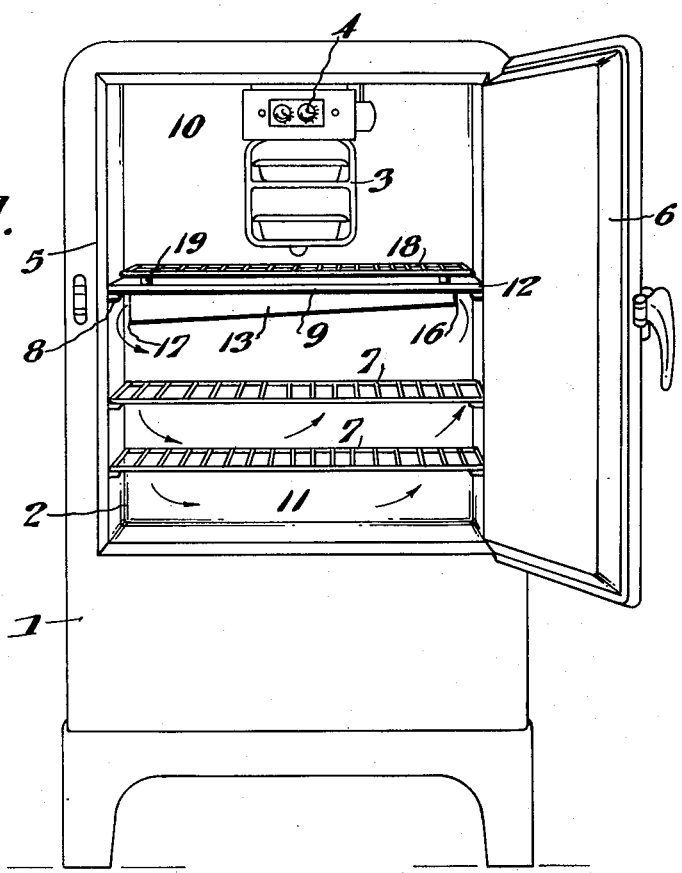
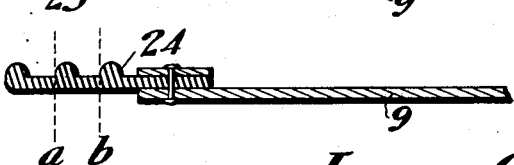
Inventor
James G. Scott
By Lloyd W. Patch
his Attorney March 5, 1940.  J. G. SCOTT  2,192,562
REFRIGERATOR APPARATUS
Filed March 11, 1939   3 Sheets-Sheet 2
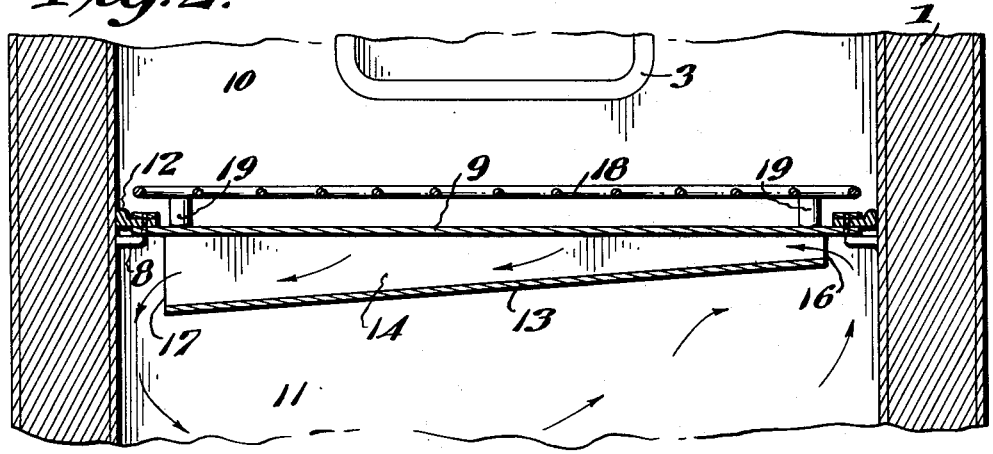
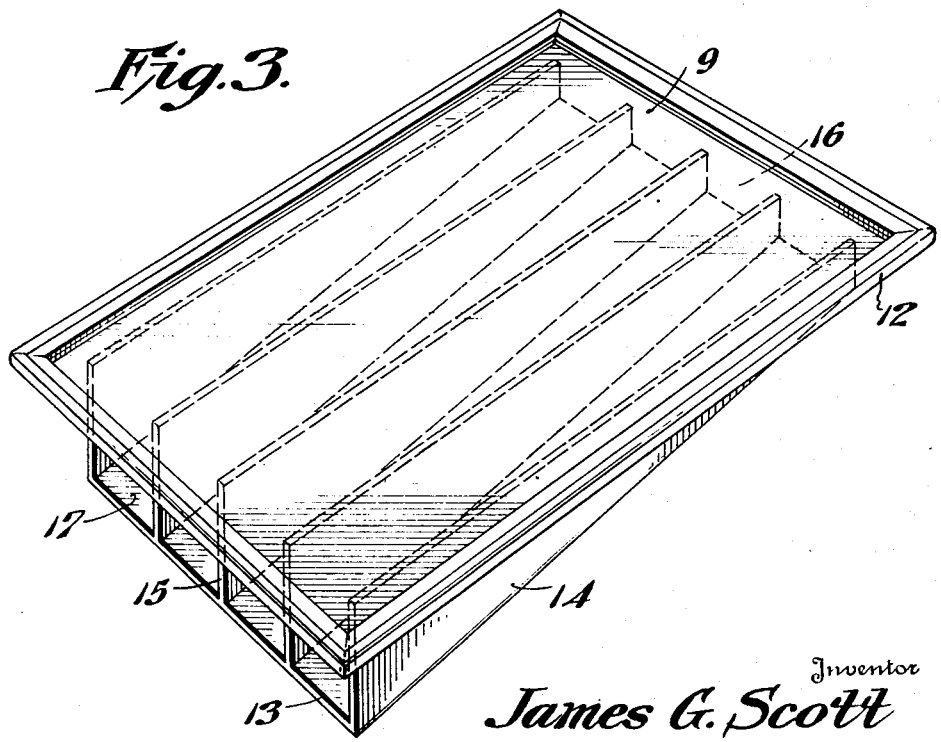
Inventor
James G. Scott
By Lloyd W. Patch
his Attorney March 5, 1940.  J. G. SCOTT  2,192,562

REFRIGERATOR APPARATUS

Filed March 11, 1939  3 Sheets-Sheet 3

Inventor
James G. Scott
By Lloyd W. Pateb
his Attorney

Patented Mar. 5, 1940

2,192,562

UNITED STATES PATENT OFFICE 2,192,562

REFRIGERATOR APPARATUS

James G. Scott, Washington, D. C.

Application March 11, 1939, Serial No. 261,389

8 Claims. (Cl. 62—89)

My invention relates to improvements in refrigerator apparatus, and particularly to structure and apparatus intended and adapted to be associated and used with an ordinary automatic refrigerator, such as electric and gas refrigerators as now employed for domestic and other purposes.

With such refrigerators as now in use, the refrigerating or heat absorbing unit or mechanism is ordinarily set or adjusted to operate at a capacity sufficient to maintain a temperature in the food storage compartment sufficiently high to prevent freezing of liquid and perishable foods, with the consequent result that the mechanism must be ordinarily set up or boosted for quick ice making, and must then be sufficiently retarded to again raise the temperature and prevent damage to the perishable foods; and, it is the primary object of my invention to provide means or apparatus to be used with an ordinary refrigerator whereby the control for the heat exchange mechanism can be set and maintained constant to maintain a temperature in a food storage compartment sufficiently high to prevent injury to foods damaged by freezing, and at the same time a space or compartment is maintained at a relatively lower temperature for food freezing and for preservation of frosted or frozen foods.

A further object is to so construct the apparatus that it can be adapted to and used with substantially all types of refrigerators having heat absorption or refrigerating means capable of adjustment, whereby the usual single food storage compartment of the refrigerator can be divided into a quick freezing compartment around the heat absorption or refrigerating unit, and a general food storage compartment to be maintained at a relatively higher temperature.

Another object is to provide a heat exchange wall that can be fitted in place without structural alterations in the ordinary refrigerator, and without the use of or necessity for special tools or appliances or operations, and which will effectively divide the usual single compartment into a freezing compartment and a food storage compartment, with the wall member serving and functioning as a heat absorption element to maintain proper temperature in the food storage compartment.

Still another object and purpose is to provide means that will accomplish conduction and circulation to thus maintain a substantially uniform temperature in all parts of the food storage space.

Still a further purpose resides in providing structure that will accomplish a natural circulation of air in the food storage compartment.

Another object is to provide apparatus that will permit constant maintenance of a low evaporator or refrigerator unit temperature, thus permitting fast freezing and preservation of frosted or fozen foods in the freezing compartment, without necessity for maintaining a correspondingly low temperature in a general food storage and refrigerating compartment.

With the above and other objects in view, some of which will be apparent to those skilled in the art and others of which result from the adaptation and use of the apparatus, my invention includes certain novel features of construction and combinations and arrangements of parts which will be hereinafter set forth in connection with the drawings and then pointed out in the claims.

In the drawings:

Figure 1 is a view in perspective looking into the open front of a refrigerator having my invention employed therewith.

Fig. 2 is an enlarged fragmentary sectional view taken substantially from side to side through the adaptation in Figure 1.

Fig. 3 is a view in perspective to better show the construction of the heat-exchange division wall.

Fig. 4 is an enlarged fragmentary sectional detail view through an edge of the heat-exchange wall.

Figs. 5 and 6 are views similar to Fig. 4 illustrating modified constructions.

Figure 7:
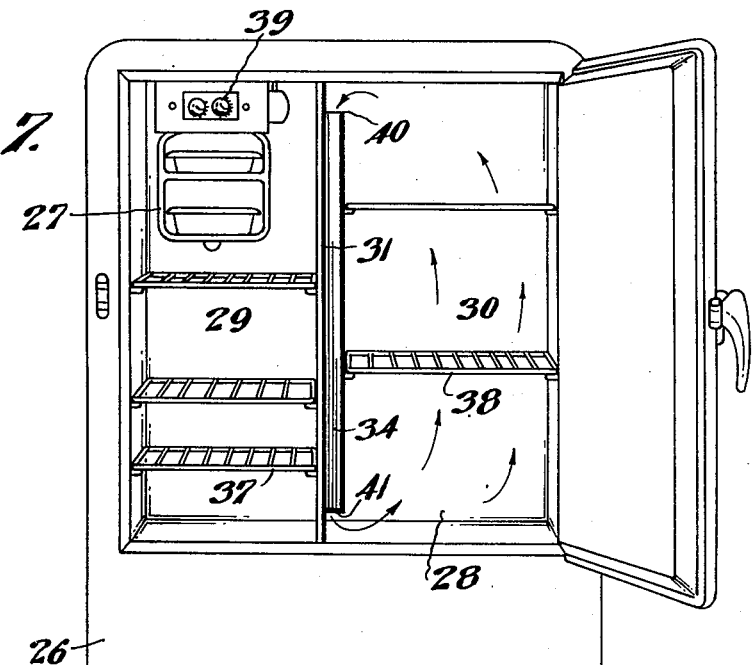
Fig. 7 is a perspective view similar to Figure 1 disclosing a modified construction and embodiment.

With refrigerators of the domestic or household type, as now in use, the evaporator, or other refrigerating means, is ordinarily located at the top or near one side of a single large food storage compartment, and while the refrigerating unit is usually of such size and capacity as to permit a sufficient heat absorption to reduce the immediately surrounding area, as for example the space provided for reception of ice cube trays, to a low temperature, the entire food storage space cannot be successfully and economically reduced to low temperatures such as may be required for quick freezing of food products, for maintenance of frosted foods in their frozen condition, and for other purposes where a low temperature is necessary or desirable. Furthermore, even though the entire food storage compartment might be brought to low temperature, the refrigerator would then be useful only for freezing or frozen storage space, and the usual requirement for preservation of milk and other liquids, and for storage and preservation of leafy vegetables and many other materials injured by freezing would not be met.

For economical and satisfactory service, it is desirable that domestic or household, or similar type of refrigerator, shall provide for quick freezing for meats and other foods or materials to be preserved, and for maintenance of quick frozen or frosted foods in this frozen condition, as well as for storage of liquids and ordinary foodstuffs, with which it is not necessary or desirable that a freezing temperature be maintained.

Also, it is desirable that provision be made whereby frosting, with consequent extraction of moisture from the atmosphere and drying out of food products, be positively prevented and precluded in the food storage compartment; and, that air be circulated therein to guard against stagnation and building up of toxic conditions in or around food products or other materials in the storage space. It has been found that foodstuffs, of both plant and animal tissues, are composed of innumerable tiny cells, in and between which are chemically complex colloidal solutions containing or made up of several solutions of different properties. When such food tissues freeze, fresh water ice crystallizes out, leaving evermore concentrated solutions of the several dissolved substances, so that the food product is not really completely frozen until its temperature has been lowered beyond the cryohydric points of the several solutions.

As the size of crystals increases with the time allowed for them to form, the more slowly the product is frozen the larger the individual ice crystals will become, so that with slow frozen products such crystals may seriously rupture some of the cells of the product, while they compress and dehydrate others. Freezing more or less alters the distribution of liquids within the animal and plant tissues, thus unbalancing the colloidal structure of the cellular and intercellular contents, this disturbance apparently being more pronounced and less reversible in plant tissues than in animal flesh. Numerous other changes may occur during freezing, such as discoloration, oxidation, evaporation, and loss of volatile flavoring elements. If, however, the freezing be sufficiently rapid, it not only prevents the formation of ice crystals large enough to be detrimental, but also minimizes the other forces of damage which follow the slow extraction of heat. With most of the foods which have so far been quick frozen, it is true that, commercially speaking, the faster the freezing the better the product.

Further, with quick frozen food products, and especially quick frozen meats, no special precautions are necessary in thawing out products, for when the minute ice crystals are thawed the water is readily reabsorbed by the comparatively undamaged tissue.

Due to their content of dissolved substances, perishable food products do not freeze homogeneously, but freezing of the moisture content takes place progressively as the temperature is lowered. It has been found that with most food products freezing commences at from 31.5 degrees F. to 27.5 degrees F., and is completed at considerably lower temperatures. While perhaps 75% of freezing occurs between 31 degrees F. and 23 degrees F., this is the zone of maximum crystallization, and the principal damage to products during freezing will occur within this zone. Therefore, to preserve food products in the best possible condition it is essential that the products be passed or carried through this temperature range so fast that the minimum of physical and chemical damage is done to the tissues. As the percentage of water content in the various ordinary food products, both vegetable and animal, may vary between 40% and 95%, it becomes apparent that quick freezing requires attainment and maintenance of a surrounding atmosphere of lower temperature than is practicably attainable in an ordinary household or domestic refrigerator, and further, it becomes apparent that attempted maintenance of a sufficiently low temperature to accomplish fast freezing will render the household refrigerator unsuitable as a receptacle or container for storage of milk, leafy vegetables, and many other food products.

Further, since it is essential that heat be removed from the product rapidly enough to assure all of the advantages of quick freezing, the refrigerating media must be held or maintained at temperatures low enough to insure this desired speed of freezing. As the working load and the cost of producing refrigeration increases rapidly as the temperature is lowered, an ordinary household refrigerator cannot be set for and operated at a temperature suitable for quick freezing, due to the fact that the heat absorption unit is relatively smaller than is desirable or necessary for cooling the relatively large food storage space of the refrigerator to a sufficiently low temperature.

Further, since it is necessary to remove from the product the maximum of heat in a minimum of time, obviously, the largest possible percentage of heat should be removed by conduction, and the product must be so supported and confined that the freezing shall be from at least two opposite sides simultaneously, without the possibility of reabsorption of heat to the product from contact with surrounding or supporting heat-exchange structures.

It has been found that in freezing fish, whereas at 30.3 degrees F., there is substantially no freezing, at 30 degrees F., the fish is substantially 42% frozen, and so on progressively to 18 degrees F. where the product is substantially 89% frozen, and it is a purpose of my invention to provide structure for use with an ordinary household mechanical refrigerator, so that a confined freezing compartment or space can be divided off around and adjacent to the evaporator or other heat absorption structure, and fish and other animal and plant food products can be confined therein and can be quickly reduced or subjected to temperatures sufficiently low to accomplish quick freezing, while at the same time the main portion of the food containing space within the refrigerator is maintained as a food storage compartment where foodstuffs can be placed to be preserved at relatively higher temperatures that will not cause injury to food products ordinarily damaged by freezing or exposure to low temperatures.

Also, while quick freezing will accomplish the initial step in the preservation of frozen foodstuffs, storage of such frozen products under unfavorable conditions, as in a too high temperature, will adversely affect the flavor, color, and other characteristics of the product. Thus since enzymic action materially hastens oxidation, the higher the storage temperature and the greater the amount of oxygen or air in contact with and immediately surrounding the product, the more rapid oxidation will be. Since deleterious chemical changes take place more slowly as the temperature is lowered and the quantity of surrounding air is decreased, the prolonged storage of frozen products can be most safely maintained in a confined and limited atmosphere at low temperature, a safe temperature being around 5 degrees F.

As has been stated, automatic refrigerators as now sold and in use are ordinarily capable of adjustment to accomplish a sufficient heat absorption to reduce the surrounding atmosphere to a low temperature, and thus the apparatus can be set to accomplish and maintain quick freezing temperatures in a limited, constricted and confined space.

With the adaptation illustrated in Fig. 1, the refrigerator 1 has the usual storage compartment 2 therein with an evaporator 3 in the upper part of the compartment. Conventional cold-control or adjusting means is illustrated at 4. The compartment 2 has an opening 5 through the front thereof, and a door 6 is provided to close this opening. The storage compartment 2 has shelves 7 fitted therein and held at desired elevations by supporting stops 8, and in other respects this is intended as illustrative of a usual and ordinary refrigerator construction such as is found in many automatic refrigerators as now being manufactured and as already in use.

A heat-exchange wall 9, which is made of sheet metal or of any desired and suitable material, is formed to be of a size and shape to fit substantially horizontally within and close across the refrigerator compartment space, preferably below and closely adjacent to the evaporator or refrigerating unit or means 3, and as is illustrated in Fig. 1, this heat-exchange wall 9 is conveniently fitted to be held in place by the usual shelf supports 8, although any other supporting or mounting means as desired may be employed. Inasmuch as the heat-exchange wall 9 is intended and adapted to divide the compartment 2 into an upper freezing space 10 surrounding the refrigerating unit 3, and a lower non-communicating storage space 11, I provide a suitable packing 12 around the edge of the heat-exchange wall 9 to engage with the side and back walls of the refrigerating compartment 2, and to be engaged by the door 6, when closed, so that in effect all communication from the space 10 to the space 11 is cut off.

On the lower side of the heat-exchange wall 9, I provide a heat and air conducting fin and flue structure, so that this structure is exposed within the storage compartment 11. As illustrated, an inclined plate 13 is suspended from the heat-exchange wall 9 by the tapered side wall portions 14, and in this manner an air circulating flue structure, constricted at one end and widened downwardly or enlarged at the other, is provided immediately below the heat-exchange wall 9. Under some conditions it may be found necessary or desirable to provide heat and air conducting fins 15 intermediate the side wall portions 14, and with this construction a plurality of air conducting and circulating flues are provided with the fins serving also as heat-exchange portions, and to increase the heat-exchange properties of the inclined plate 13 due to connection of these fins with the plate 13 and the heat-exchange wall 9.

With the parts constructed as set forth, the heat-exchange wall 9 can be fitted within the refrigerator compartment 2, substantially as shown in Fig. 1, and the packing structure 12 at the edge thereof will seal against circulation of air or communication from the freezing space to the storage space. The control at 4 can be adjusted to increase the heat absorption and the refrigerating means can then be operated to attain and maintain a low temperature in the freezing space 10. Due to conductivity of the heat-exchange wall 9, the temperature within the food storage space will be reduced. However, since a circulating flue structure is provided on the side of the heat-exchange wall 9, a circulation of air will be accomplished within this storage space 11, somewhat after the course indicated by the arrows, with the warmer air rising along the plate 13 to pass through the constricted end of the flue, at 16, and then the cold air rolling down or dropping around the inclined upper side of this plate 13 to be discharged through the widened end of the flue, at 17. It has been found that with this flue plate and conducting fin arrangement a circulation of air is attained within the storage space 11, and due to the circulation the temperature can be maintained substantially uniform in all parts of the storage space 11. It has also been found that a temperature can be attained and maintained within the freezing compartment 10 sufficiently low for fast freezing of meats and other food products, after the manner explained above, and for preservation of frozen or frosted foods and other products.

I have found that where foods to be frozen are exposed on two or more sides much quicker freezing can be accomplished, and that better freezing results and greatly superior results in the preservation of frozen or frosted foods will be attained where there is no contact of any part of the product with any part of the heat-exchange or other conducting walls of parts. With this in mind, I provide in the upper or freezing space 10, a supporting rack 18, upon which rack foods to be frozen, as well as frozen products, can be placed and supported. This supporting rest or rack 18 can be mounted in place in any desired manner, and in the present instance I have shown the same as carried by insulating blocks or legs 19 that rest upon the heat-exchange wall 9, thereby stopping heat exchange from wall 9 to the support 18, and at the same time spacing the support 18 sufficiently to permit full exposure of the upper side of the heat-exchange wall 9. This support or rack 18 can be made as an open grill, or can be constructed in any other desired manner, and it will be seen that food products and other materials placed upon this rack 18 will be substantially exposed on all sides to the low temperature within the freezing space 10.

Various forms of packing means can be employed to insure a proper fit of the heat-exchange wall 9, and in Fig. 4 I have illustrated a packing strip 20 as fitted on one side and around the edge of the wall 9, and held in place thereon by a securing strip 21. Obviously, various forms of fastenings can be employed to assemble and secure the strip 21 and the packing 20 in place around the edge of the wall 9.

In Fig. 5 I have disclosed a modified construction in which the packing strip 22 is made of channelled and substantially U-shaped form, to be fitted over the edge of the heat-exchange wall 9, and if desired a resilient insert 23, of sponge rubber or other suitable material, may be fitted within the channel to cause the packing strip to yield outwardly into sealing contact with the walls and the door of the refrigerator structure.

Since the compartment 2 of different makes of refrigerators will vary in size and shape, and may vary in different models of the same make, it may be found desirable to provide for fitting of the packing to the particular compartment, and this may be accomplished in the manner illustrated in Fig. 6. As here shown, the packing strip 24 is made relatively wide in its extent from the edge of the heat-exchange wall 9, and to fit different shapes and sizes of refrigerator compartments this packing strip 24 can be cut off or severed, as at a or b.

The angle of inclination of the plate 13 can be changed to vary the rate of circulation of air into the constricted end 16 and from the widened end 17 of the flue, and in this way the temperature differential between the storage compartment 11 and the freezing compartment 10 can be varied. Also, as the fin portions 15 serve for heat conduction, the temperature differential can be varied by increasing or decreasing the number of fins and by increasing and decreasing the size of the end portions 14 and the width or extent of the plate 13, in consequence of which the heat conducting surfaces will be increased or decreased.

Where the device of my invention is in use, it may sometimes be found desirable to reduce the heat exchange through the wall 9, and this can be accomplished by placing upon the upper side of this wall 9, and within the freezing space 10, one or more layers or thicknesses of insulating or blanketing material, as indicated at 25, in Fig. 4. As this insulation or blanket material will affect the heat conduction properties of the wall 9, the temperature differential will be correspondingly varied. Obviously, other means and methods of heat conduction control may be employed.

Obviously, the relative size of the freezing compartment 10 and the storage compartment 11 can be varied by changing the position of the heat-exchange wall 9, and this wall can be mounted higher or lower than is here illustrated, by placing the wall upon the usual shelf supports of the refrigerator or by mounting the shelf upon special supports or other means.

Figure 8:
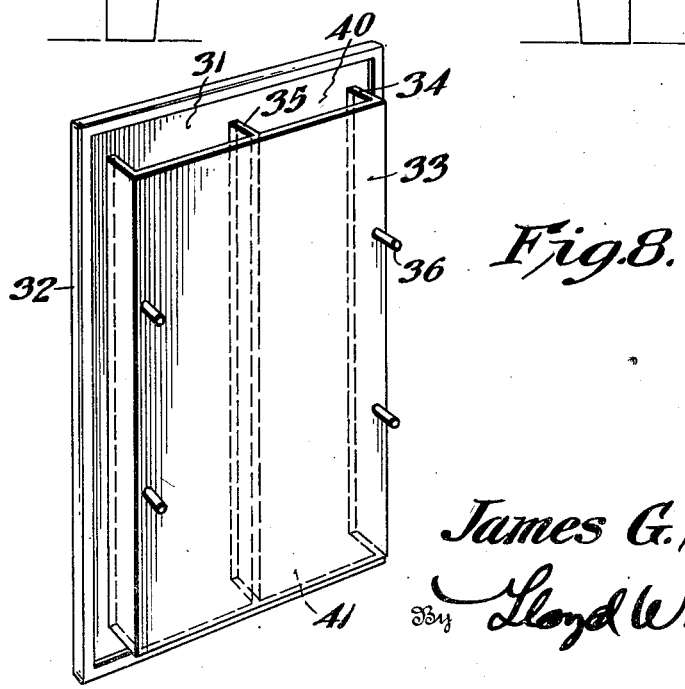
Fig. 8 is a perspective view illustrating the modified construction of the heat-exchange wall.

With the adaptation illustrated in Figs. 7 and 8, the refrigerator 26 has the evaporator 27, or other refrigerating means, located at or in one side of the storage compartment 28, and my invention is here embodied by dividing the storage compartment into a freezing space 29 and a storage space 30. To accomplish this division, the heat-exchange wall 31 is placed to extend from front to back within the compartment 28 and from the top wall to the bottom wall in a substantially upright plane. Packing material can be provided, as at 32, around the heat-exchange wall 31, and thus when the wall is in place communication from the freezing space 29 to the storage space 30 will be precluded.

To aid in heat exchange and air conduction, I provide on the storage space side 30 of this heat-exchange wall 31, a flue plate 33, the side edges of which are joined with the heat-exchange wall 31 through wall portions 34. If desired, one or more vane portions 35 can be provided between the side portions 34. With this adaptation, the side walls of the refrigerator and the heat-exchange wall structure can be provided with supporting rests 36, to receive shelves 37 and 38, on one or both sides of the wall structure.

In the use of the modified structure, the cold control or regulating means 39 can be adjusted to attain and maintain the desired low temperature in the freezing space 29, and the heat-exchange wall 31 will cause reduction to the proper food preserving temperature in the storage space 30. Warmer air in the storage space 30 will rise to enter at the top of the flue structure, as at 40, and will pass downwardly adjacent to the heat-exchange plate 31, during which passage heat is extracted from the air, so that a natural flow and circulation is established as the cooled air flows through the opening 41 at the bottom of the flue structure. In this manner, circulation of air and attainment and maintenance of the desired substantially uniform temperature in all parts of the storage space 30 will be accomplished.

I have found that with refrigerator apparatus constructed in accordance with my invention, and with a domestic or household refrigerator converted by insertion of the heat-exchange wall, it is possible to set and adjust the refrigerating apparatus so that a temperature is maintained in the freezing compartment sufficiently low for quick freezing of meats and other foodstuffs that can be purchased in quantities, and may not be needed for immediate use, and also for substantially perfect preservation of frozen or frosted foods in their original condition; and, that at the same time relatively higher temperatures necessary and suitable for preservation of milk and other liquids and ordinary and unfrozen food products and the like can be attained and maintained in the storage space. At the same time, no wall or other part presented within the storage space is sufficiently refrigerated to cause frosting with consequent loss of moisture from materials in the storage space of the confined atmosphere. Due to the fact that the heat exchange accomplished by the heat-exchange wall and the associated conduction parts causes circulation of the air confined in the storage space, this air will be naturally circulated in all parts of the storage space to prevent stagnation or the promotion of toxic conditions, and the moisture in this circulated air will serve to preserve the fresh condition of leafy vegetables and the like. It has been found that where this structure is used for storage of leafy vegetables and the like moisture is deposited and precipitated upon the foodstuffs somewhat after the manner of dew formation, even though the temperature in the freezing space be sufficiently low to accomplish fast freezing of meats and the like therein.

Where and when high humidity atmospheric conditions prevail, opening of the door with consequent ingress of this humid air may cause sufficient condensation on the heat-exchange wall to accumulate drops of water or dew beads hanging from or adherent to the under side of this wall. Such moisture beads or drops may also accumulate where liquids and foods and other materials having a high moisture content are placed in the storage space. With my invention, the inclined circulating wall 13 will catch and laterally convey toward a side wall any dropping or dripping liquid resultant from moisture condensing on the heat-exchange wall and forming dew beads, which liquid would ordinarily and otherwise drop off at random and unrestrained onto and into foods and other materials in the storage space or on the shelves thereof. Obviously, wall 13 can be made of any desired size and shape and can be inclined in any manner and at any angle to best accomplish the desired result.

While I have herein shown and described only certain specific embodiments of my invention and have suggested only certain possible modified constructions and adaptations, it will be appreciated that many changes and variations can be made in the form and construction and assembly and manner of use or embodiment of my refrigerating apparatus and heat-exchange wall, without departing from the spirit and scope of my invention.

I claim:

1. A refrigerator comprising a cabinet, a plurality of walls defining a chamber within said cabinet, mechanical refrigerating means in said chamber, supporting means carried by certain of said walls, a shelf structure removably carried by said means in spaced relation to said evaporator, and packing means cooperating with said walls and the edge of said shelf structure to divide said chamber into a low temperature compartment and a storage compartment closed off from the first-mentioned compartment, said shelf structure having an inclined wall portion within the food storage compartment to induce natural circulation of air.

2. A refrigerator comprising a cabinet, a plurality of walls defining a chamber within said cabinet, an evaporator within said chamber, supporting means carried by certain of said walls, a shelf removably carried by said means in spaced relation to said evaporator, packing means carried by said shelf and cooperating with said shelf and said walls to divide said chamber into a low temperature compartment and a food storage compartment closed off from the first-mentioned compartment, and means carried by said shelf and cooperating therewith to define an air channel arranged to promote a circulation of air through the last-mentioned compartment.

3. A refrigerator comprising a cabinet, a plurality of walls defining a chamber within said cabinet, an evaporator within said chamber, supporting means carried by certain of said walls, a shelf removably carried by said means in spaced relation to said evaporator, packing means carried by said shelf and cooperating with said shelf and said walls to divide said chamber into a low temperature compartment and a food storage compartment closed off from the first-mentioned compartment, and a plate within the food storage compartment and carried by said shelf and arranged to cooperate therewith to cause a circulation of air through the food storage compartment.

4. A refrigerator comprising a cabinet, a plurality of walls defining a chamber within said cabinet, an evaporator in said chamber, supporting means carried by certain of said walls, a shelf structure removably carried by said means in spaced relation to said evaporator, packing means cooperating with said walls and the edge of said shelf to divide said chamber into a low temperature compartment and a storage compartment closed off from the first-mentioned compartment, said shelf structure having an inclined portion in the food storage compartment to induce natural circulation of air, and supporting means including a rack portion above said shelf structure and separated therefrom sufficiently to permit free circulation of air and to support materials within the low temperature compartment out of conducting contact with said shelf structure.

5. A refrigerator comprising a cabinet having a walled chamber therein, cooling means within said chamber adjacent to one of the walls thereof operable to produce a temperature below the freezing point of water, a heat exchange wall member removably fitted within said chamber in spaced relation to said cooling means, packing means cooperating with the heat exchange wall and the walls of the chamber to divide said chamber into a low temperature compartment and a food storage compartment closed off from the first-mentioned compartment, and means carried by said heat exchange wall within the storage compartment and forming therewith channel structure arranged to cause a circulation of air through said compartment.

6. A refrigerator comprising a cabinet, a plurality of walls defining a chamber within said cabinet, an evaporator in said chamber, supporting means on certain of said walls, a heat exchange wall removably carried by said supporting means in proximity to and spaced relation from said evaporator, and packing means cooperating between said walls to divide said chamber into a low temperature compartment around the evaporator and a storage compartment closed off from the first-mentioned compartment, the spacing of said heating exchange wall from the evaporator being so correlated to the normal operating temperature range of the evaporator that said heat exchange wall is normally the coldest wall of the storage compartment and is normally maintained within a temperature range above frosting within which moisture in the storage compartment will condense on the wall and will not freeze, and said heat exchange wall being provided with an inclined portion in the storage compartment whereby water of condensation will be directed to flow by gravity to one side.

7. A refrigerator comprising a cabinet, a plurality of walls defining a chamber within said cabinet, an evaporator in said chamber, supporting means on certain of said walls, a heat exchange wall removably carried on said supporting means in proximity to and spaced relation from said evaporator in position to serve as a shelf, packing means cooperating between said walls to divide said chamber into a low temperature compartment around the evaporator and a storage compartment closed off from the first-mentioned compartment, the spacing of said heat exchange wall from the evaporator being so correlated to the normal operating temperature range of the evaporator that said heat exchange wall is normally the coldest wall of the storage compartment and is normally maintained within a temperature range above frosting within which moisture in the storage compartment will condense on the wall and will not freeze, said heat exchange wall being provided with an inclined portion in the storage compartment whereby water of condensation will be directed to flow by gravity to one side, and a rack portion positioned above said heat exchange wall and separated therefrom sufficiently to permit free circulation of air and to support materials adjacent to said wall within the low temperature compartment and out of conducting contact with said heat exchange wall.

8. A refrigerator comprising a cabinet having a walled chamber therein, cooling means within said chamber adjacent to one of the side walls thereof operable to produce a temperature below the freezing point of water, a heat exchange wall removably fitted within said chamber between the bottom and top and rear walls in spaced relation to said cooling means, packing means cooperating with the heat exchange wall and the walls of the chamber to divide said chamber into a low temperature compartment around the cooling means and a storage compartment on the opposite side of the heat exchange wall and closed off from the first-mentioned compartment, means carried by said heat exchange wall within the storage compartment and forming therewith channel structure arranged to cause a circulation of air through said storage compartment, shelf supporting means on opposite walls and the heat exchange wall structure, and shelves in said compartments.

JAMES G. SCOTT.